Feb. 13, 3,716,291

LENS SYSTEM WITH SELECTIVE IMAGE REVERSION

Filed Aug. 3, 1971

INVENTOR:
HENRY A. GIESECKE

ATTORNEYS

INVENTOR:
HENRY A. GIESECKE

INVENTOR:
HENRY A. GIESECKE

INVENTOR:
HENRY A. GIESECKE

ATTORNEYS

United States Patent Office 3,716,291
Patented Feb. 13, 1973

3,716,291
LENS SYSTEM WITH SELECTIVE
IMAGE REVERSION
Henry A. Giesecke, Oklahoma City, Okla., assignor to
Apromat, Incorporated, Oklahoma City, Okla.
Filed Aug. 3, 1971, Ser. No. 168,624
Int. Cl. G02b 17/02
U.S. Cl. 350—203
15 Claims

ABSTRACT OF THE DISCLOSURE

A lens system with selective image reversion includes a symmetrical objective lens system which is fixedly supported in a housing. A generally imperforate frame is mounted in the center cross section of the housing for reciprocation along a line extending between the elements of the lens system and has a pair of slots formed in it which extend the width of the lens system. An image reversion system comprising first, second and third external reflective surfaces is mounted in one of the slots of the frame and a transparent member having an index of refraction matched to the optical characteristics of the image reversion system is mounted in the other slot. The frame also supports a plate mounted for rotation to position either an imperforate portion or an $f{:}16$ aperture or an $f{:}22$ aperture in alignment with the transparent member. Structure is provided for normally positioning the transparent member in alignment with the lens system and for reciprocating the frame to scan the image reversion system through the lens system and thereby form an inverted image.

BACKGROUND AND SUMMARY OF THE INVENTION

This invention relates to a lens system with selective image reversion, and more particularly to an objective lens system for selectively producing either a conventional image or an image that is reversed about one meridian.

As is well known, a conventional camera produces an image that is reversed about both meridians, i.e., left to right and top to bottom. It is also known that it is sometimes highly desirable to produce an image that is reversed about one meridian, for example top to bottom, but is not reversed about the other meridian, in this case, left to right. For example, cameras intended for use both in conventional photography and photolithography and similar applications must be capable of generating either a conventional image or a reversed image, as required.

Systems for selectively providing either a conventional image or a reversed image have been known heretofore. For example, see Wekeman Pat. No. 2,470,277 granted May 17, 1949; Huebner Pat. No. 2,788,709 granted Apr. 16, 1957; and Giesecke Pat. No. 3,447,859 granted June 3, 1969. However, notwithstanding these and other attempts at providing a workable system, a number of problems have remained unsolved. For example, in the Wekeman structure, it is necessary to reorient a portion of the lens system in order to change from a conventional image to a reversed image, and vice versa. Also, the Wekeman device provides no means for maintaining focusing when it is changed from the conventional image configuration to the reversed image configuration. The Huebner device comprises an iris diaphragm and an image reversion system which are hingedly supported on the opposite sides of a lens system so that either may be selectively positioned in the lens system. This construction has the inherent disadvantages of allowing dirt and other foreign matter to accumulate within the lens system. The Huebner device does, however, provide means for changing the positioning of one element of the lens system when the system is converted from the conventional image configuration to the reversed image configuration. By this means the Huebner apparatus is quickly refocused. Finally, the Giesecke invention provides an enclosed system which does not permit dirt, etc. to accumulate within the lens system and also provides for maintaining focusing when shifting between the conventional image configuration and a reversed image configuration. However, it has been found that the Giesecke structure is too bulky for use with many of the smaller cameras that are otherwise suitable for use in photolithography and similar applications.

In addition to the foregoing deficiencies of the Wekeman, Huebner and Giesecke devices, prior art systems capable of providing either a conventional image or a reversed image have been characterized by certain other limitations. For example, the cost of such a system has often been in excess of that of the camera that the system is intended to supplement. Also, prior art systems have been limited to a field of view of about 45°. Finally, many prior art systems have been incapable of generating a uniformly illuminated reversed image.

The present invention relates to a system for selectively producing either a conventional image or a reversed image which overcomes the foregoing and other disadvantages that are characteristic of the prior art. In accordance with the preferred embodiment of the invention, a transparent member is normally positioned between the elements of a symmetrical objective lens system. The transparent member is supported on a frame which also supports an image reversion system. The frame is mounted for movement to selectively position the image reversion system between the elements of the lens system and thereby generate a reversed image. The index of refraction of the transparent member is matched to the optical characteristic of the image reversion system so that focusing is maintained during the operation of the system.

DESCRIPTION OF THE DRAWINGS

A more complete understanding of the invention may be had by referring to the following detailed description when taken in conjunction with the accompanying drawings, wherein.

DETAILED DESCRIPTION

Figure 1:
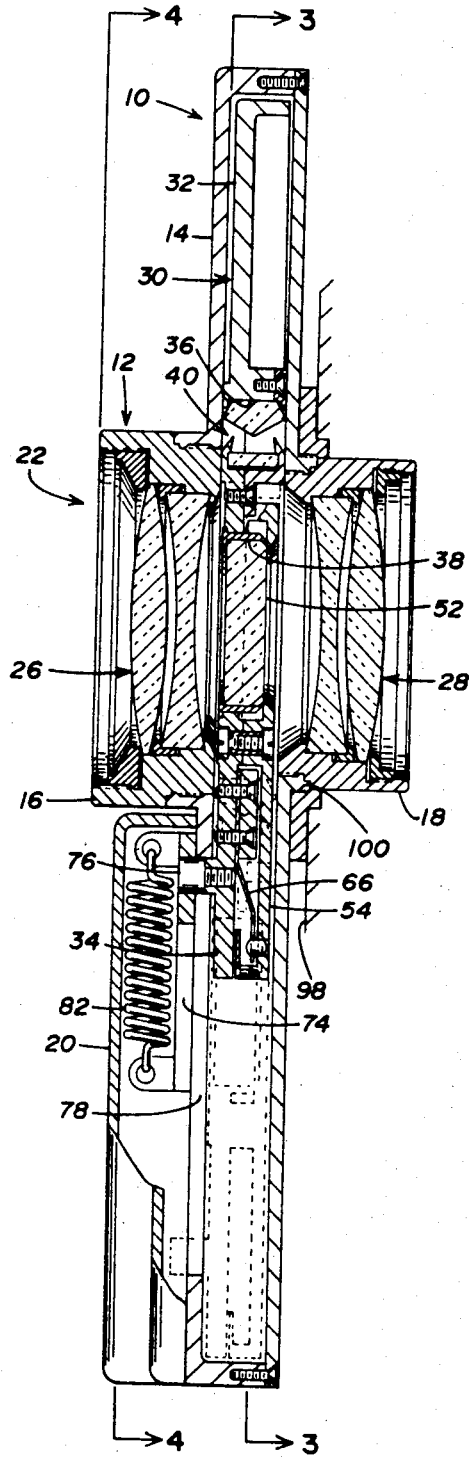
FIG. 1 is a longitudinal sectional view of the preferred embodiment of the invention showing the component parts thereof in extreme operational states.

Referring now to the drawings, and particularly to FIG. 1 thereof, there is shown an apparatus 10 comprising a lens system with selective image reversion constructed in accordance with the present invention. The apparatus 10 includes a housing 12 comprising an upper portion 14, a forward lens supporting portion 16, a rearward lens supporting portion 18 and a lower portion 20. A conventional symmetrical objective lens system 22 is mounted in the housing 12. More particularly, the symmetrical objective lens system 22 includes a forward set of lens elements 26 which are supported in the forward lens supporting portion 16 of the housing 12 and a rearward set of lens elements 28 which are supported in the rearward lens supporting portion 18 of the housing 12. An important feature of the invention is the fact that the symmetrical objective lens system 22 is not specially designed. Quite to the contrary, virtually any conventional symmetrical objective lens system of the type suitable for use in high quality cameras and the like may be employed in conjunction with the present invention. The invention is also readily adapted for use with lens systems other than objective lens systems and with non-symmetrical lens systems.

The apparatus 10 further includes a frame 30 which is supported in the housing 12 for sliding movement between the position shown in full lines in FIG. 1 and the position shown in dashed lines in FIG. 1. The frame 30 includes an upper portion 32 which is received and guided by the upper portion 14 of the housing 12 and a lower portion 34 which is received in and guided by the lower portion 20 of the housing 12. The frame 30 is substantially imperforate, but has a pair of slots 36 and 38 formed through it. Each of the slots 36 and 38 extends substantially the entire width of the symmetrical objective lens system 22.

Figure 2:
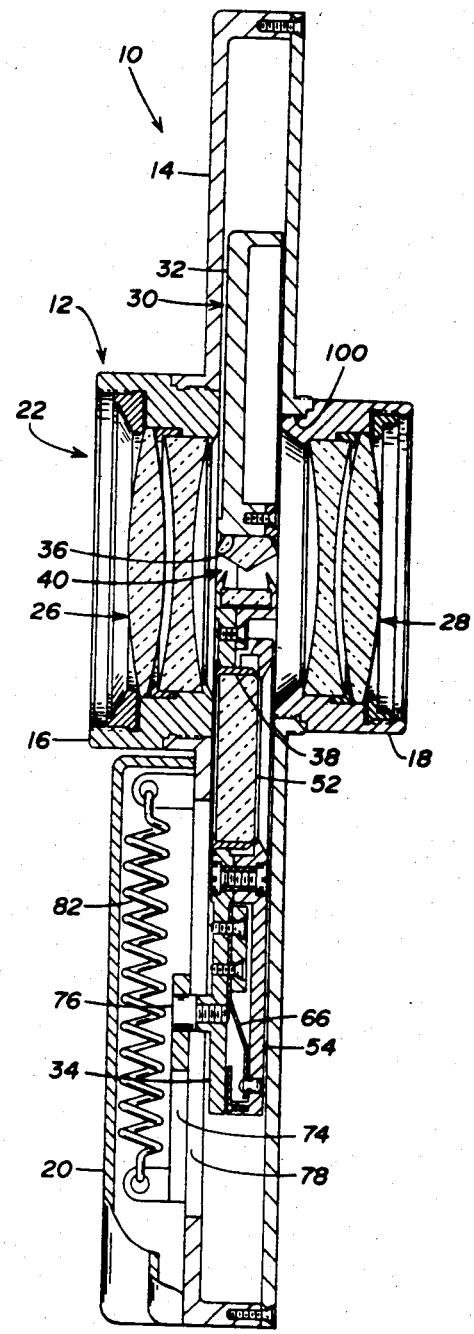
FIG. 2 is a view similar to FIG. 1 showing the component parts in an intermediate operational state.
Figure 5:
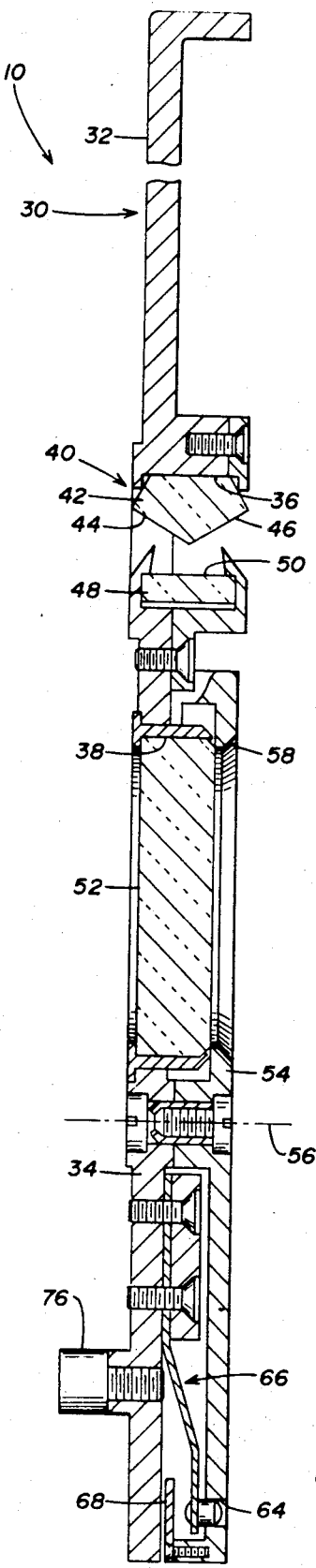
FIG. 5 is an enlarged longitudinal sectional view of certain component parts of the invention.

Referring now to FIG. 5, an image reversion system 40 is mounted in the slot 36 of the frame 30. The image reversion system 40 includes an upper reflective member 42 having external reflective surfaces 44 and 46 which comprise first and third reflective surfaces of the image reversion system 40, respectively. The image reversion system 40 further includes a lower reflective member 48 having an external reflective surface 50 which comprises a second reflective surface of the image reversion system 40. The reflective surfaces 44, 50 and 46 are so arranged that when the image reversion system 40 is positioned between the elements of the symmetrical objective lens system 22, that is, when the image reversion system 40 is positioned as shown in FIG. 2, light passing through the forward lens elements 26 of the symmetrical objective lens system 22 is received by the first reflective surface 44 and is reflected thereby to the second reflective surface 50. The second reflective surface 50 in turn reflects light received from the first reflective surface 44 to the third reflective surface 46. Finally, the third reflective surface 46 reflects light received from the second reflective surface 50 through the rearward lens elements 28 of the symmetrical objective lens system 22. Thus, it will be understood that whenever the image reversion system 40 is positioned between the elements of the symmetrical objective lens system 22, light passing through the symmetrical objective lens system 22 is reflected three times. By this means the apparatus 10 forms an image that is reversed from left to right but not from top to bottom relative to a conventional image.

As has been indicated, the image reversion system 40 comprises three external reflective surfaces. The use of an image reversion system comprised solely of external reflective surfaces is preferred because it eliminates any possibility of distortions caused by refractions within the image reversion system. However, it will be understood that other types of image reversion systems can be employed in the practice of the invention. For example, an image reversion system comprising a unitary body of transparent material having three internal reflective surfaces arranged similarly to the surfaces 44, 50 and 46 of the image reversion system 40 may be mounted in the slot 36 of the frame 30, if desired.

A compensation plate 52 is positioned in the slot 38 of the frame 30. As those skilled in the art will realize, the length of the light path through the objective lens system 22 is increased to a predetermined extent whenever the image reversion system 40 is positioned between the elements of the lens system. The compensation plate 52 comprises a body of transparent material having an index of refraction which is matched to the optical characteristics of the image reversion system 40. That is, the index of refraction of the compensation plate 52 is selected so that the effective length of the light path through the symmetrical objective lens system 22 when the compensation plate 52 is positioned between the elements of the lens system is identical to the actual length of the light path through the lens system 22 when the image reversion system 40 is positioned between the elements of the lens system. This renders the focal characteristics of the objective lens system 22 of the apparatus 10 constant regardless of whether the image reversion system 40 or the compensation plate 52 is positioned between the elements of the lens system.

Figure 3:
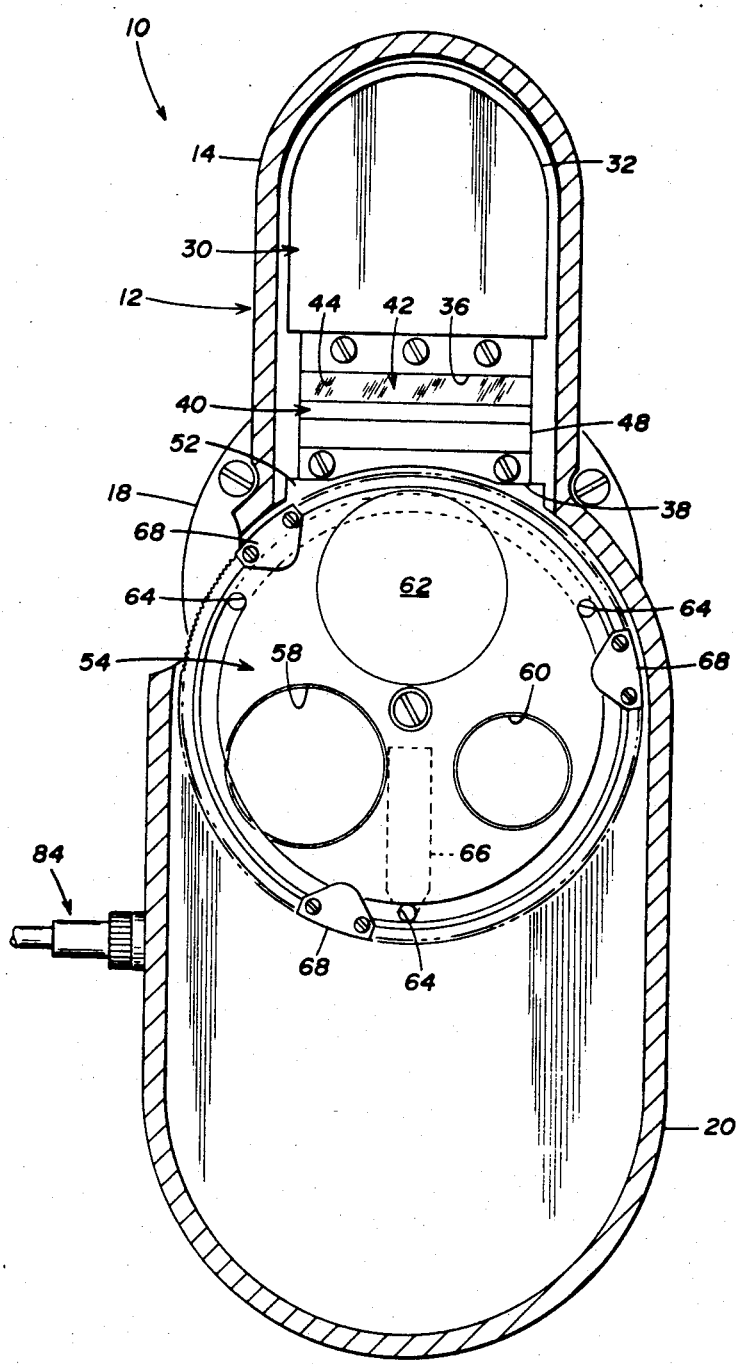
FIG. 3 is a sectional view taken generally along the line 3—3 in FIG. 1 in the direction of the arrows.

Referring now to FIGS. 3 and 5, a plate 54 is supported on the frame 30 for rotation with respect thereto about an axis 56. The plate 54 comprises an $f:16$ aperture 58, an $f:22$ aperture 60, and an imperforate portion 62. Due to the positioning of the axis 56, the plate 54 is adapted for selective rotation to align either the $f:16$ aperture 58 or the $f:22$ aperture 60 or the imperforate portion 62 with the compensation plate 52. Therefore, when ever the compensation plate 52 is positioned between the elements of the objective lens system 22, the passage of light through the lens system is either blocked, or restricted, or unrestricted, depending on the rotational positioning of the plate 54.

Figure 4:
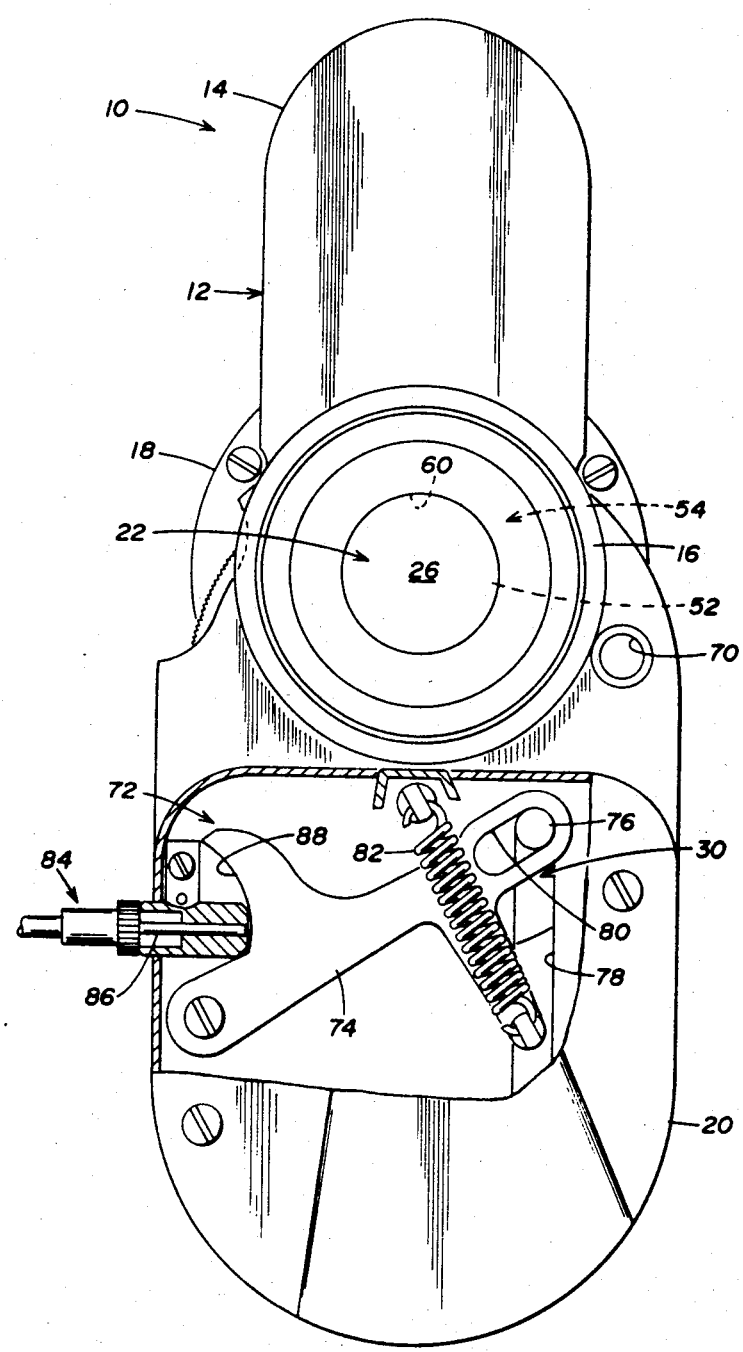
FIG. 4 is a sectional view taken generally along the line 4—4 in FIG. 1 in the direction of the arrows.

The plate 54 is provided with three detent apertures 64 which are positioned for cooperation with a spring detent 66 mounted on the frame 30 to retain the plate 54 in any selected angular relationship to the frame 30. The various possible settings of the plate 54 are indicated on three tabs 68 which are secured to the plate. As is best shown in FIG. 4, a viewing window 70 is provided in the housing 12 whereby the tabs 68 may be observed to determine the rotational positioning of the plate 54.

The apparatus 10 further includes a mechanism 72 for controlling the positioning of the frame 30 relative to the housing 12. The mechanism 72 includes a cam 74 supported on the frame 12 for pivotal movement with respect thereto. A cam follower 76 extends from the frame 30 through a slot 78 formed in the housing 12 and into a slot 80 formed in the cam 74. The cam 74 is urged toward the position shown in FIG. 4 by a spring 82 connected between the frame 12 and the cam 74.

A conventional Bowden wire 84 having a shaft 86 is secured to the housing 12. Upon actuation of the Bowden wire 84, the shaft 86 cooperates with a camming surface 88 formed on the cam 74 to pivot the cam 74 relative to the housing 12 against the action of the spring 82. Since the frame 30 is coupled to the cam 74 by means of the cam follower 76, pivotal movement of the cam 74 results in sliding movement of the frame 30 relative to the housing 12 from the position shown in full lines in FIG. 1 through the position shown in FIG. 2 to the position shown in dashed lines in FIG. 1. Upon release of the cable release mechanism 84, the frame 30 is immediately returned to the position shown in full lines in FIG. 1 by the spring 82.

Figure 6:
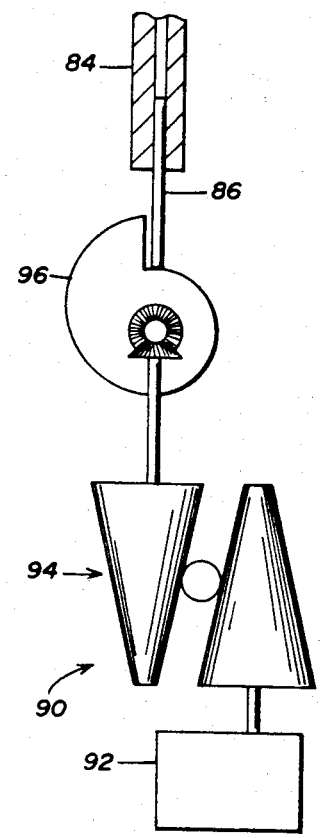
FIG. 6 is a schematic illustration of a timing mechanism useful in conjunction with the invention.

The Bowden wire 84 may be actuated by any convenient mechanism. However, in accordance with the preferred embodiment of the invention, a variable speed mechanism such as the mechanism 90 which is schematically illustrated in FIG. 6 is employed to operate the Bowden wire 84. The mechanism 90 comprise an electric motor 92 having an output coupled to a variable speed drive 94. The output of the variable speed drive 94 is in turn coupled to a drop-off cam 96. The shaft 86 of the Bowden wire 84 is positioned for actuation by the drop-off cam 96.

In the operation of the mechanism 90, the motor is energized to rotate the cam 96 at a rate controlled by the variable speed drive 94. The cam 96 initially extends the shaft 86 of the Bowden wire 84 and thereby scans the image reversion system 40 from the position shown in full lines in FIG. 1 through the position shown in full lines in FIG. 2 to the position shown in FIG. 3 at a relatively slow rate. When the step of the cam 96 becomes aligned with the shaft 86, the spring 82 returns the frame 30 to the position shown in FIG. 1 relatively rapidly. By this means, the image reversion system 40 of the apparatus 10 is moved along a line extending between the elements of the optical system 22 from a position above the optical system through the optical system to a position below the optical system, and then is immediately returned to its original position.

Operation

In use, the apparatus 10 is mounted in a camera in place of a conventional lens barrel. For example, the apparatus 10 may be mounted as shown in FIG. 1 wherein the housing 12 is shown secured to a wall 98 comprising the wall of a camera and the rearward portion 18 of the housing 12 is shown extending through a lens barrel receiving aperture 100 formed in the wall 98. The plate 54 is initially rotated to position the f:16 aperture 58 in alignment with the optical axis of the symmetrical objective lens system 22. The lens system 22 is then focused by direct observation of the subject to be photographed through the rear lens elements 28, the compensation plate 52 and the forward lens element 26. When the lens system 22 is properly focused, the plate 54 is rotated to position the imperforate portion 62 in alignment with the optical axis of the lens system. The camera is then loaded with photosensitive material such as conventional photographic film or the like. Finally, the apparatus 10 is actuated to form an image on the photosensitive material.

The apparatus 10 is operable to form either a conventional image or an inverted image on the photosensitive material. If a conventional image is desired, the plate 54 is rotated relative to the frame 30 to align either the f:16 aperture 58 or the f:22 aperture 60 with the optical axis of the lens system 22. This permits light to pass through the lens system 22, whereby a conventional image is formed on the photosensitive material. When the apparatus 10 is employed in this manner, the duration of the exposure is controlled either by rotating the plate 54 to align the imperforate portion 62 with the optical axis of the lens system 22 or by controlling the period of time that the subject is illuminated.

If an inverted image is desired, the mechanism 90 is actuated to rotate the cam 96. Upon rotation, the cam 96 gradually extends the shaft 86 of the Bowden wire 84 which in turn gradually pivots the cam 74 relative to the frame 12. Since the cam 74 is connected to the frame 30 by the cam follower 76, this action gradually slides the frame 30 in the housing 12 from the position shown in full lines in FIG. 1 through the position shown in FIG. 2 to the position shown in dashed lines in FIG. 1. After the cam 96 has concluded a full revolution, the spring 82 immediately returns the frame 30 to the position shown in full lines in FIG. 1.

Because the image reversion system 40 is mounted in the frame 30, the foregoing manipulation of the frame 30 operates to scan the image reversion system 40 along the line extending between the elements of the symmetrical objective lens system 22. That is, the image reversion system 40 is scanned from the position shown in full lines in FIG. 1 wherein it is out of alignment with any portion of the lens system 22 through the position shown in FIG. 2 wherein it is aligned with the optical axis of the lens system 22 to a position indicated by dashed lines in FIG. 1 wherein it is out of alignment with any portion of the lens system 22 but is positioned on the opposite side of the lens system 22 from the position shown in FIG. 1. Whenever the image reversion system 40 is positioned between the elements of the lens system 22, light passing through the forward elements 26 of the lens system is received by the reflective surface 44 of the reflective member 42 and is reflected by the surface 44 to the reflective surface 50 of the reflective member 48. The reflective surface 50 reflects the light to the reflective surface 46 of the reflective member 42 which in turn reflects the light through the rearward elements 28 of the lens system 22. By this means, the light is reflected three times as it passes through the image reversion system 40 so that the image formed by the lens system 22 is reversed. Since the index of refraction of the compensation plate 52 is matched to the optical characteristics of the image reversion system 40, the inverted image is properly focused notwithstanding the fact that light passes through the image reversion system 40 rather than through the compensation plate 52 in order to form the image.

Those skilled in the art will realize that during the utilization of the apparatus 10 to form a reversed image, the slot 36 formed in the frame 30 serves as a slot shutter. That is, the duration of the exposure of the photographic material depends on the rate at which the image reversion system 40 is scanned between the elements of the lens system 22, which in turn depends on the setting of the variable speed drive 94. This construction has been found to be highly advantageous in the apparatus 10 in that whereas prior art lens systems capable of providing either a conventional image or a reversed image have been limited to a field of view of approximately 45°, the use of the slot shutter arrangement in the apparatus 10 results in a field of view of approximately 72°. It has also been found that the slot shutter arrangement results in a highly desirable uniform illumination of the reversed image.

The apparatus 10 may also be actuated to form a reversed image by simply actuating the mechanism 72 to move the image reversion system 40 from the position shown in full lines in FIG. 1 to the position shown in full lines in FIG. 2 and retaining the image reversion system 40 in alignment with the optical axis of the lens system 22 while the reversed image is formed. In such a case, the duration of the exposure is controlled either by controlling the period of time that the image reversion system 40 is positioned between the elements of the lens system 22 or by controlling the period of time that the subject is illuminated.

It will be understood that various alternative structures can be incorporated in the basic apparatus 10 which is illustrated in the drawings. For example, a mechanism responsive to initiation of the reciprocation of the frame 30 to vary the spacing between the forward and rearward elements 26 and 28 of the lens system 22 can be employed in the apparatus 10 in lieu of the compensation plate 52. Such a mechanism would function to automatically refocus the lens system 22 during the use of the image reversion system 40 rather than to compensate for the increase in the length of the light path through the lens system 22 as is the case when the compensation plate 52 is employed in the apparatus 10. Another modification would comprise the use of an iris diaphragm positioned on the frame 30 in alignment with the compensation plate 52 instead of the plate 54 to control the passage of light through the lens system 22. Still another substitution would comprise the use of an image reversion system having internal reflective surfaces instead of the image reversion system 40 illustrated in the drawings.

From the foregoing, it will be understood that the present invention comprises a lens system with selective image reversion which is suitable for use in cameras of the type commonly employed in photolithography, photocopying, and similar photoprinting-type applications. The use of the invention results in numerous advantages over the prior art. For example, the apparatus is relatively inexpensive in construction and is relatively small in size so as to be compatible with the types of cameras that are now employed in photoprinting-type applications. Secondly, because of the slot shutter arrangement, the use of the invention results in a highly desirable uniform image illumination. Third, the present apparatus has a field of view of up to 72°, whereas prior image reversion systems have been limited to a field of view of no greater than 45°.

Although the preferred embodiment of the invention has been illustrated in the drawings, and described in the foregoing specification, it will be understood that the invention is not limited to the embodiment disclosed, but is capable of rearrangement, modification, and substitution of parts and elements without departing from the spirit of the invention.

What is claimed is:

1. An optical system including:
   a housing;
   a lens system fixedly supported in the housing;
   a frame supported in the housing for movement along a line extending between the elements of the lens system,
   said frame being substantially imperforate and having a slot formed therethrough which extends substantially the entire width of the lens system;
   an image reversion system positioned in the slot in the frame and comprising a first reflective surface for receiving light passing through one of the elements of the lens system, a second reflective surface for receiving light reflected from the first reflective surface, and a third reflective surface for receiving light reflected from the second reflective surface and for directing the light through the other element of the lens system; and
   means for scanning the frame along the line at a predetermined rate and thereby moving the slot in the frame from a position on one side of the lens system through the lens system to a position on the other side of the lens system.

2. The optical system according to claim 1 further comprising:
   a second slot formed in the frame and extending substantially the entire width of the optical system;
   a transparent member mounted in the second slot and having an index of refraction matched to the optical characteristics of the image reversion system so that the focal characteristics of the lens system remain constant regardless of whether the transparent member or the image reversion system is positioned between the elements of the lens system; and
   wherein the frame reciprocating means normally positions the transparent member between the elements of the lens system.

3. The optical system according to claim 2 further including means mounted on the frame for controlling the passage of light through the lens system when the transparent member is positioned between the elements of the lens system.

4. An optical system comprising:
   a lens system;
   a frame supported for movement along a line extending between the elements of the lens system;
   a body of transparent material mounted on the frame for movement thereby into the path of light passing through the lens system; and
   an image reversion system mounted on the frame for movement thereby into the path of light passing through the lens system.

5. The optical system according to claim 4 wherein the image reversion system comprises a first reflecting surface for receiving light passing through one element of the lens system, a second reflecting surface for receiving light reflected from a first reflecting surface, a third reflecting surface for receiving light reflected from the second reflective surface and for directing the light through the other element of the lens system.

6. The optical system according to claim 5 wherein the index of refraction of the body of transparent material is matched to the optical characteristics of the image reversion system so that the lens system remains in focus regardless of whether the body of transparent material or the image reversion system is positioned in the path of light passing through the lens system.

7. The optical system according to claim 6 further including:
   a plate comprising at least one opaque portion and at least one transparent portion, and
   means supporting the plate on the frame for rotation to selectively position either the opaque portion or the transparent portion of the plate in alignment with the body of transparent material.

8. The optical system according to claim 7 further including frame actuating means for normally positioning the body of transparent material in the path of light passing through the lens system and for selectivce actuation to move the frame relative to the lens system to a position wherein the image reversion system is positioned in the path of light passing through the lens system.

9. An optical system comprising:
   a housing;
   a symmetrical lens system fixedly supported in the housing;
   an image reversion system mounted in the housing for movement with respect thereto along a line extending between the element of the lens system;
   said image reversion system comprising a first reflective surface for receiving light passing through one of the elements of the lens system, a second reflective surface for receiving light reflected from the first reflective surface, and a third reflective surface for receiving light reflected from the second surface and for directing light through the other element of the lens system; and
   means for normally positioning the image reversion system out of the path of light passing through the lens system and for selectively scanning the image reversion system along the line,
   said positioning means including a substantially imperforate frame supported in the housing for sliding movement along the line extending between the elements of the lens system, said frame having a slot formed in it which extends substantially the entire width of the lens system, said image reversion system being mounted in the slot formed in the frame and extending substantially the entire width of the lens system, said positioning and scanning means operating by reciprocating the frame along the line extending between the elements of the lens system,
   said optical system further including a second slot formed in the frame and extending substantially the entire width of the lens system, and a body of transparent material having a predetermined index of refraction mounted in the second slot in the frame and extending substantially the entire width of the lens system for reciprocation with the frame from a normal position wherein the body of transparent material is positioned in the path of light passing through the lens system to a position wherein the body of transparent material is positioned out of the path of light passing through the lens system.

10. The optical system according to claim 9 wherein the image reversion system changes the focal characteristics of the lens system to a predetermined extent whenever it is positioned in the path of light passing through the lens system and wherein the index of refraction of the body of transparent material is matched to the optical characteristic of the image reversion system so that the body of transparent material changes the focal characteristics of the lens system to an identical extent whenever it is positioned in the path of light passing through the lens system.

11. An optical system comprising:
    a housing;
    a lens system mounted in the housing;
    a plate comprising an imperforate portion and at least one aperture;
    means supporting the plate for rotation to alternately position the imperforate portion and the apertu:e between the elements of the lens system and thereby control the passage of light through the lens system;
an image reversion system; and
means for selectively positioning the image reversion system between the elements of the lens system;
said positioning means comprising a frame supported in the housing for reciprocation along a line extending between the elements of the lens system, said image reversion system and plate being mounted on the frame for reciprocation therewith,
said frame being substantially imperforate and having a pair of slots formed in it each extending substantially the entire width of the lens system, said image reversion system being mounted in one of the slots in the frame, and said plate being supported for rotation to alternately position the imperforate portion and the aperture in alignment with the other slot in the frame.

12. An optical system including:
a housing;
a lens system fixedly supported in the housing;
a frame supported in the housing for movement along a line extending between the elements of the lens system;
a transparent member mounted on the frame;
a plate comprising an imperforate portion and at least one aperture;
means supporting the plate on the frame for rotation to alternately position the imperforate portion and the aperture in alignment with the transparent member;
an image reversion system mounted on the frame; and
means interconnecting the housing and the frame for normally positioning the transparent member between the elements of the lens system and for actuation to position the image reversion system between the elements of the lens system.

13. The optical system according to claim 12 wherein the image reversion system comprises a first external reflective surface for receiving light passing through one element of the lens system, a second external reflective surface for receiving light reflected from the first external reflective surface, and a third external reflective surface for receiving light reflected from the second external reflective surface and for directing the light through the other element of the lens system.

14. The optical system according to claim 13 wherein the positioning means comprises means for selective actuation to move the image reversion system from a position on one side of the lens system along a line extending through the lens system to a position on the opposite side of the lens system.

15. The optical system according to claim 14 wherein the image reversion system positioning means further includes means for controlling the rate of movement of the image reversion through the lens system.

References Cited

UNITED STATES PATENTS

| | | | |
|---|---|---|---|
| 2,283,788 | 5/1942 | Briechle et al. | 95—57 UX |
| 2,788,709 | 4/1957 | Huebner | 350—209 X |
| 2,380,216 | 7/1945 | Carter | 350—205 X |
| 2,406,798 | 9/1946 | Burroughs | 350—286 X |

JOHN K. CORBIN, Primary Examiner

U.S. Cl. X.R.

95—57; 350—204, 207